United States Patent
Amemiya

(10) Patent No.: US 11,260,871 B2
(45) Date of Patent: Mar. 1, 2022

(54) ROAD INFORMATION DETECTION DEVICE, DRIVING ASSISTANCE DEVICE, ROAD INFORMATION DETECTION SYSTEM, ROAD INFORMATION DETECTION METHOD, DRIVING CONTROL METHOD AND PROGRAM

(71) Applicant: NEC CORPORATION, Tokyo (JP)

(72) Inventor: Hideki Amemiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 194 days.

(21) Appl. No.: 16/061,726

(22) PCT Filed: Dec. 12, 2016

(86) PCT No.: PCT/JP2016/086906
§ 371 (c)(1),
(2) Date: Jun. 13, 2018

(87) PCT Pub. No.: WO2017/104611
PCT Pub. Date: Jun. 22, 2017

(65) Prior Publication Data
US 2018/0370536 A1    Dec. 27, 2018

(30) Foreign Application Priority Data

Dec. 17, 2015    (JP) .............................. JP2015-246388

(51) Int. Cl.
*B60W 40/072*    (2012.01)
*G08G 1/00*    (2006.01)
(Continued)

(52) U.S. Cl.
CPC .......... *B60W 40/072* (2013.01); *B60W 40/06* (2013.01); *G05D 1/0088* (2013.01);
(Continued)

(58) Field of Classification Search
CPC ............... B60W 40/072; B60W 40/06; B60W 2520/10; B60W 2552/05; B60W 2556/50; B60W 30/12; B60W 40/076; G01C 21/30
See application file for complete search history.

(56) References Cited

U.S. PATENT DOCUMENTS 5,899,954 A * 5/1999 Sato ...................... G01C 22/02
340/988
6,014,595 A * 1/2000 Kobayashi ....... G08G 1/096716
340/438
(Continued)

FOREIGN PATENT DOCUMENTS

EP    2269883 A1    1/2011
JP    07-071973 A    3/1995
(Continued)

OTHER PUBLICATIONS

Communication dated Nov. 27, 2018 from the Japanese Patent Office in counterpart Application No. 2015-246388.
(Continued)

*Primary Examiner* — Redhwan K Mawari
(74) *Attorney, Agent, or Firm* — Sughrue Mion, PLLC

(57) ABSTRACT

A road information detection device includes a curve-starting-position identification part configured to identify the starting position of a transition curve according to a road structure upon detecting an attached structure on a road. It further includes an image information capture part configured to capture an image, an attached-structure detection part configured to detect the identification of an attached structure reflected in the image, and a storage media configured to store the position of an attached structure. The curve-starting-position identification part may identify the starting position based on the detected identification of an attached structure, the stored position of an attached struc-
(Continued)

ture, and a distance from the attached structure to the starting position of a transition curve.

12 Claims, 10 Drawing Sheets

(51) Int. Cl.
| | |
|---|---|
| *B60W 40/06* | (2012.01) |
| *G09B 29/10* | (2006.01) |
| *G08G 1/16* | (2006.01) |
| *G08G 1/09* | (2006.01) |
| *G08G 1/0962* | (2006.01) |
| *G05D 1/00* | (2006.01) |
| *G05D 1/02* | (2020.01) |
| *G06K 9/00* | (2022.01) |

(52) U.S. Cl.
CPC ......... *G05D 1/0246* (2013.01); *G05D 1/0272* (2013.01); *G05D 1/0278* (2013.01); *G06K 9/00798* (2013.01); *G08G 1/00* (2013.01); *G08G 1/09* (2013.01); *G08G 1/09623* (2013.01); *G08G 1/16* (2013.01); *G09B 29/10* (2013.01); *G05D 2201/0213* (2013.01)

(56) References Cited

U.S. PATENT DOCUMENTS

| | | | | |
|---|---|---|---|---|
| 6,459,891 B1* | 10/2002 | Whinnett | ........... | H04B 7/18513 455/12.1 |
| 7,068,844 B1* | 6/2006 | Javidi | ................ | G06K 9/00818 382/209 |
| 2006/0080874 A1* | 4/2006 | Eberwein | ................ | G09F 13/04 40/564 |
| 2006/0190158 A1* | 8/2006 | Shiiba | ................ | B60K 31/0066 701/70 |
| 2008/0007619 A1* | 1/2008 | Shima | ....................... | G06T 7/80 348/118 |
| 2010/0302361 A1 | 12/2010 | Yoneyama et al. | | |
| 2010/0332127 A1* | 12/2010 | Imai | ..................... | B60W 30/12 701/532 |
| 2012/0065873 A1* | 3/2012 | Van de Velde | ........ | G01C 21/32 701/119 |
| 2013/0002861 A1* | 1/2013 | Mitsugi | .............. | G06K 9/00812 348/135 |
| 2013/0115961 A1* | 5/2013 | Shibayama | ........... | H04W 16/18 455/446 |
| 2013/0124083 A1* | 5/2013 | Kratzsch | ............ | G01C 21/3602 701/410 |
| 2014/0074287 A1* | 3/2014 | LaFary | .................. | B25J 9/1676 700/253 |
| 2015/0057922 A1* | 2/2015 | Yabe | .................. | G01C 21/3626 701/437 |
| 2016/0180710 A1* | 6/2016 | Maeda | ............. | G08G 1/096783 340/932 |
| 2016/0275793 A1* | 9/2016 | Yokochi | ............. | G08G 1/09626 |
| 2018/0370536 A1* | 12/2018 | Amemiya | .............. | G09B 29/10 |

FOREIGN PATENT DOCUMENTS

| | | | |
|---|---|---|---|
| JP | 2000-047573 A | | 2/2000 |
| JP | 2005-189004 A | | 7/2005 |
| JP | 2007-47129 A | | 2/2007 |
| JP | 2008-286566 A | | 11/2008 |
| JP | 2009-014645 A | | 1/2009 |
| JP | 2009-040329 A | | 2/2009 |
| JP | 2010-117839 A | | 5/2010 |
| JP | 2010-282278 A | | 12/2010 |
| JP | 2011-017989 A | | 1/2011 |
| JP | 2012007922 A | * | 1/2012 |
| JP | 2012-164254 A | | 8/2012 |
| JP | 2014-164254 | * | 8/2012 |
| JP | 2012-253498 A | | 12/2012 |
| JP | 2014-069799 | * | 4/2014 |
| JP | 2014-069799 A | | 4/2014 |
| JP | 2014-189214 A | | 10/2014 |

OTHER PUBLICATIONS

Communication dated Apr. 16, 2019 from the Japanese Patent Office in counterpart Application No. 2015-246388.
International Search Report for PCT/JP2016/086906 dated Mar. 7, 2017 [PCT/ISA/210].
Extended European Search Report for EP Application No. EP16875588.2 dated Jan. 29, 2021.

* cited by examiner

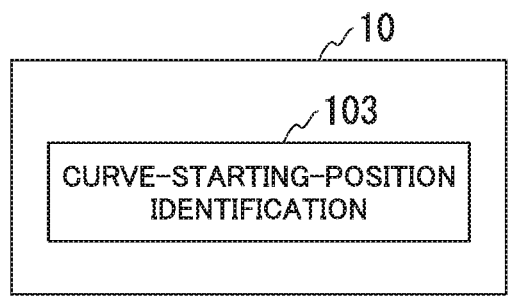
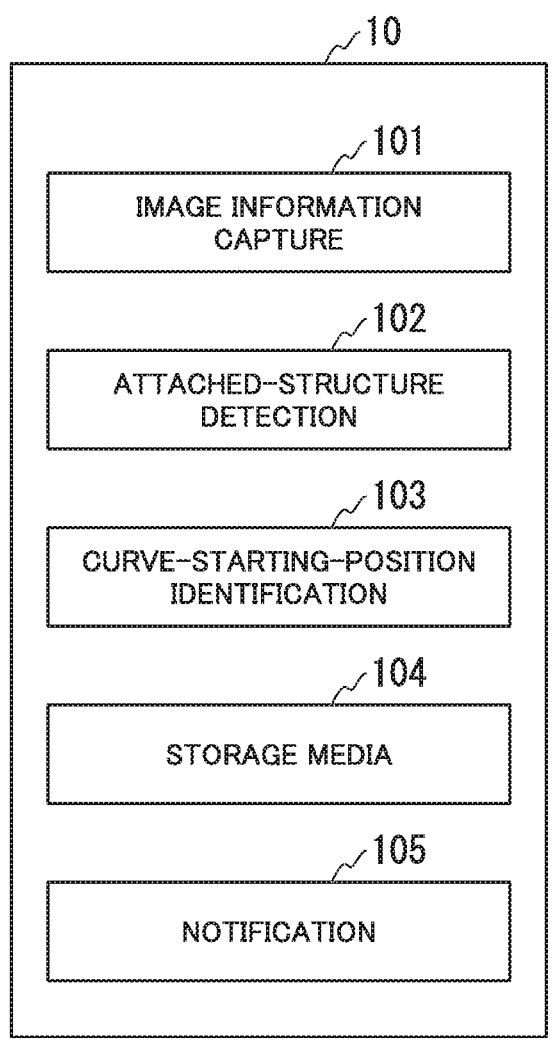

FIG. 3

| No. | IDENTIFICATION OF ATTACHED STRUCTURE | DISTANCE FROM ATTACHED STRUCTURE TO STARTING POSITION OF TRANSITION CURVE |
|---|---|---|
| 1 | dt1 | D1 |
| 2 | dt2 | D2 |
| 3 | dt3 | D3 |
| ... | ... | ... |

TBL1

FIG. 8

| No. | DATA FOR UPWORD DIRECTION | DATA FOR DOWNWARD DIRECTION | IDENTIFICATION OF ATTACHED STRUCTURE | DISTANCE FROM ATTACHED STRUCTURE TO STARTING POSITION OF TRANSITION CURVE |
|---|---|---|---|---|
| 1 | | | dt1 | D1 |
| 2 | | | dt2 | D2 |
| 3 | | | dt3 | D3 |
| 4 | | | dt4 | D4 |
| 5 | | | dt5 | D5 |
| ... | | | ... | ... |
| 31 | | | dt1 | D31 |
| 32 | | | dt3 | D32 |
| 33 | | | dt5 | D33 |
| 34 | | | dt4 | D34 |
| 35 | | | dt6 | D35 |
| ... | | | ... | ... |
| 61 | | | dt1 | D61 |
| 62 | | | dt1 | D62 |
| ... | | | ... | ... |
| 100 | | | dt100 | D100 |

TBL2

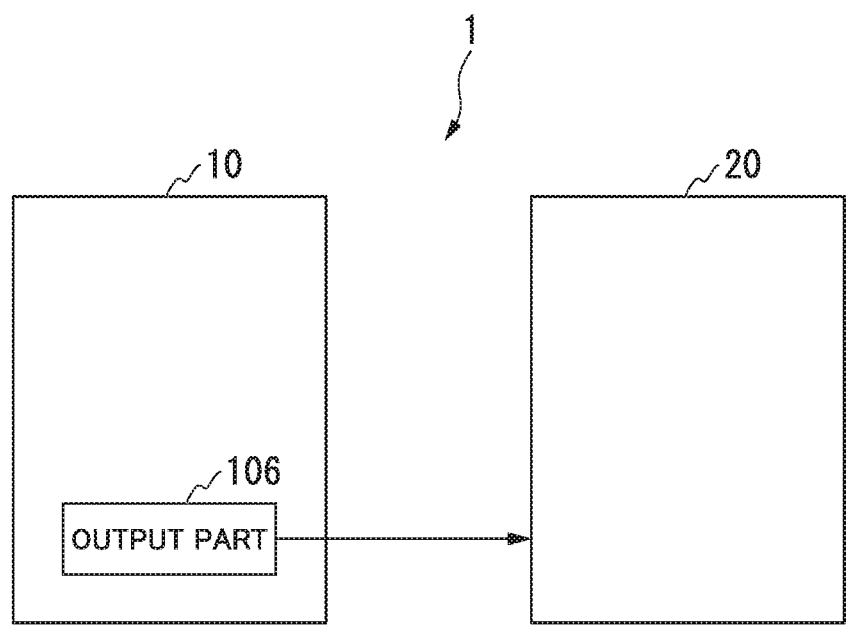
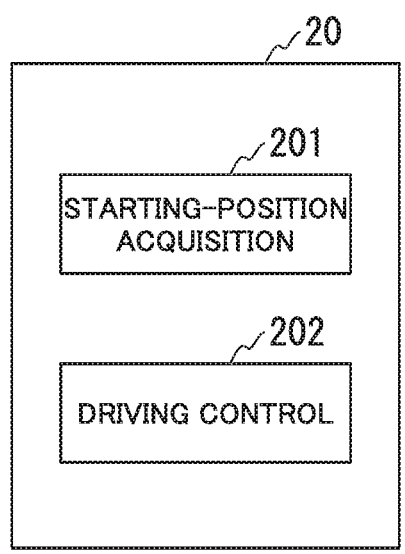

FIG. 13

| No. | IDENTIFICATION OF ATTACHED STRUCTURE | DISTANCE FROM ATTACHED STRUCTURE TO STARTING POSITION OF TRANSITION CURVE | INTERVAL FROM NO. 1 | INTERVAL FROM NO. 2 | INTERVAL FROM NO. 3 | INTERVAL FROM NO. 4 | INTERVAL FROM NO. 5 |
|---|---|---|---|---|---|---|---|
| 1 | dt1 | D1 | 0 | J12 | J13 | J14 | J15 |
| 2 | dt2 | D2 | J21 | 0 | J23 | J24 | J25 |
| 3 | dt3 | D3 | J31 | J32 | 0 | J34 | J35 |
| 4 | dt4 | D4 | J41 | J42 | J43 | 0 | J45 |
| 5 | dt5 | D5 | J51 | J52 | J53 | J54 | 0 |

TBL4

ROAD INFORMATION DETECTION DEVICE, DRIVING ASSISTANCE DEVICE, ROAD INFORMATION DETECTION SYSTEM, ROAD INFORMATION DETECTION METHOD, DRIVING CONTROL METHOD AND PROGRAM

CROSS REFERENCE TO RELATED APPLICATIONS

This application is a National Stage of International Application No. PCT/JP2016/086906 filed Dec. 12, 2016, claiming priority based on Japanese Patent Application No. 2015-246388 filed Dec. 17, 2015, the entire disclosure of which is incorporated herein by reference.

TECHNICAL FIELD

The present invention relates to a road information detection device, a driving assistance device, a road information detection system, a road information detection method, a driving control method, and a program.

BACKGROUND ART

For the purpose of safe and comfortable driving of vehicles on roads, it is necessary to detect the position of vehicles on roads and to accurately detect the starting position of curves and slopes, thus allowing vehicles to run according to road structures.

Patent Literature 1 serving as a related art discloses a technology for allowing vehicles to run on fuel injected according to inclines of slopes upon determining the existence of slopes within a predetermined range of distance on the course of vehicles based on map information storing incline information with navigation devices for detecting the position of vehicles.

Patent Literature 2 serving as a related art discloses a technology for acquiring information, representing the shape of roads that vehicles may approach in the neighbor of intersections, via on-vehicle communication devices.

Patent Literature 3 serving as a related art discloses a technology for modeling and recording the entirety of roads on a database by analyzing roads into multiple segments and thereby modeling the shape of analyzed roads.

Patent Literature 4 serving as a related art discloses a technology for correcting the detected position of vehicles upon detecting the position of specific facilities of roads based on image information captured by on-vehicle cameras.

CITATION LIST

Patent Literature

Patent Literature 1: Japanese Patent Application Publication No. 2014-189214
Patent Literature 2: Japanese Patent Application Publication No. 2012-253498
Patent Literature 3: Japanese Patent Application Publication No. 2000-047573
Patent Literature 4: Japanese Patent Application Publication No. H07-071973

SUMMARY OF INVENTION

Technical Problem

As one method for detecting the starting position of slopes or curves on roads, it is possible to use map information. However, it is very difficult to include all the accurate positions and structures of slopes or curves of roads into maps due to the enormous amount of time and labor.

For this reason, it is required to develop a technology for simply and accurately identifying the start position of slopes or curves of roads.

The present invention aims to provide a road information detection device, a driving assistance device, a road information detection system, a road information detection method, a driving control method, and a program, which can solve the above problem.

Solution to Problem

To achieve the above object, the present invention provides a road information detection device including a curve-starting-position identification part configured to identify the starting position of a transition curve according to a road structure upon detecting an attached structure on a road.

The present invention provides a driving assistance device including a starting-position acquisition part configured to acquire the starting position of a transition curve from a road information detection device including a curve-starting-position identification part configured to identity the starting position of a transition curve upon detecting an attached structure on a road according to a road structure; and a driving control part configured to carry out at least one of acceleration control, brake control, and running-direction change control based on the starting position.

The present invention provides a road information detection system including a road information delivery system configured to deliver road information including at least identifications of attached structures on a road, positional information of attached structures, and a relationship between the positional information and the starting positions of transition curves according to a road structure; and a road information detection device including a curve-starting-position identification part configured to identify the starting position of a transition curve according to the road structure based on the positional information of the attached structure detected on the road, and the road information.

The present invention provides a road information detection method including a process for identifying the starting position of a transition curve according to a road structure upon detecting an attached structure on a road.

The present invention provides a driving control method for a driving assistance device, including: acquiring the starting position of a transition curve from a road information detection device including a curve-starting-position identification part configured to identify the starting position of a transition curve according to a road structure upon detecting an attached structure on a road; and carrying out at least one of acceleration control, brake control, and running-direction change control based on the starting position.

The present invention provides a road information detection method for a road information detection system, including: delivering road information including at least identifications of attached structures on a road, positional information of attached structures, and a relationship between the positional information and the starting positions of transition curves according to a road structure; and identifying the starting position of a transition curve according to the road structure based on the position information of the attached structure detected on the road and the road information.

The present invention provides a program causing a computer to identify the starting position of a transition curve according to a road structure upon detecting an attached structure on a road.

The present invention provides a program causing a computer to implement: acquiring the starting position of a transition curve from a road information detection device including a curve-starting-position identification part configured to identify the starting position of a transition curve according to a road structure upon detecting an attached structure on a road; and carrying out at least one of acceleration control, brake control, and running-direction change control based on the starting position.

Advantageous Effects of Invention

According to the present invention, it is possible to simply and accurately identify the start position of slopes or curves of roads.

BRIEF DESCRIPTION OF DRAWINGS

FIG. 1 is a block diagram showing the minimum configuration of a road information detection device according to the first embodiment of the present invention.

FIG. 2 is a block diagram showing the configuration of a road information detection device according to the second embodiment of the present invention.

FIG. 3 is a chart showing a first data table according to the second embodiment.

FIG. 8 is a chart showing a second data table according to the third embodiment of the present invention.

FIG. 10 is a block diagram showing the configuration of a road information detection system according to the fourth embodiment of the present invention.

FIG. 11 is a block diagram showing the configuration of a driving assistance device according to the fourth embodiment.

FIG. 13 is a chart for explaining how to estimate an attached structure irrespective of nonexistence of some of attached structures in the foregoing embodiments of the present invention.

DESCRIPTION OF EMBODIMENTS

First Embodiment

Figure 4:
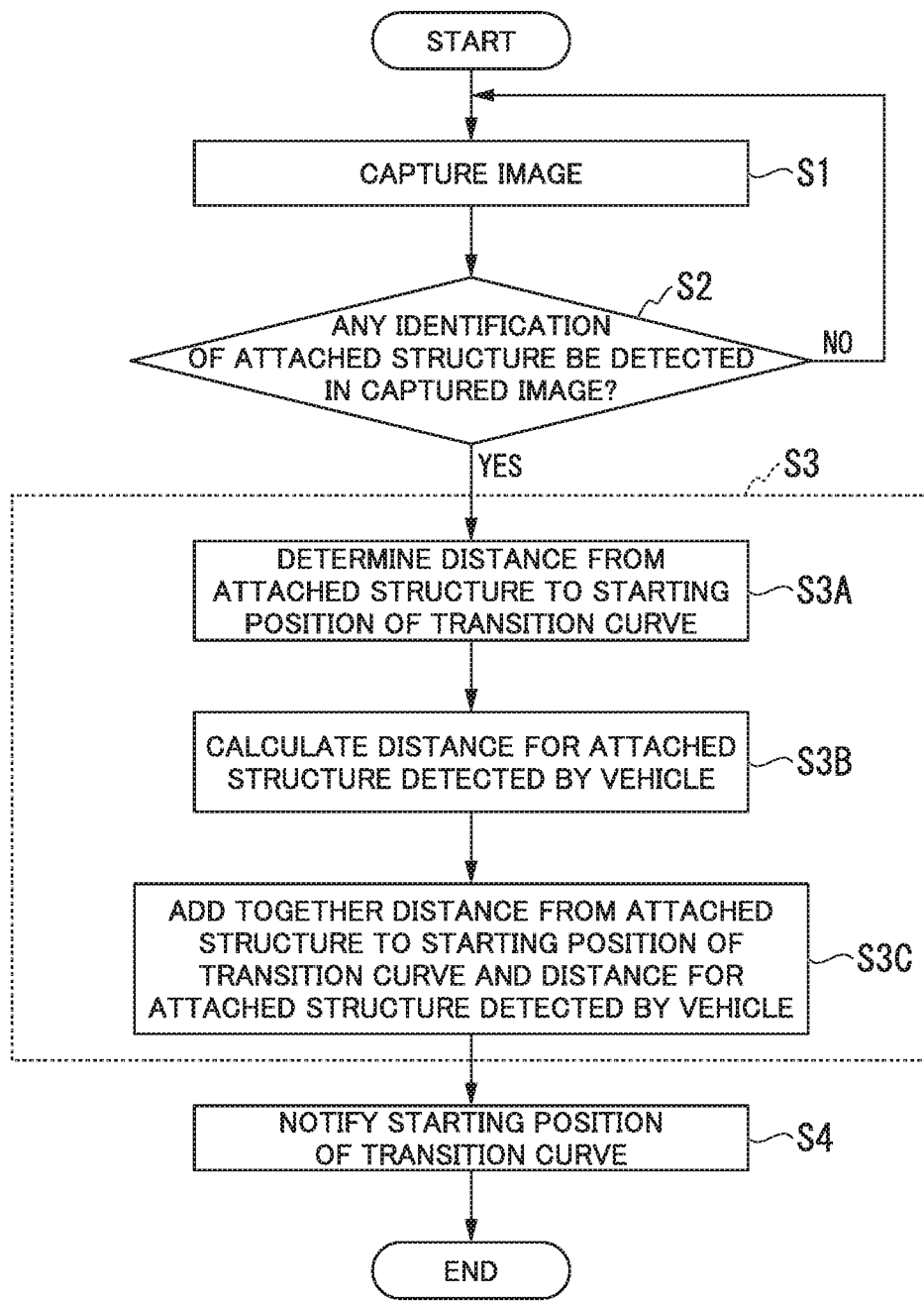
FIG. 4 a flowchart showing a processing flow of the road information detection device according to the second embodiment.

A road information detection device according to the first embodiment of the present invention will be described below.

The road information detection device according to the first embodiment is equivalent to a road information detection device having the minimum configuration of the present invention.

As shown in FIG. 1, a road information detection device 10 according to the first embodiment includes at least a curve-starting-point identification part 103.

The curve-start-point identification part 103 identifies the starting point of a transition curve of a road structure upon detecting an attached structure on road. For example, an attached structure on road may represent a road sign, a distance post (or a kilometer post), an ETC (Electronic Toll Collection system) gantry, or the like. The transition curve represents a curve interposed between a straight portion and an arc portion of a road such that a vehicle can smoothly run through the straight portion and the arc portion connected together on road. For example, the starting position of a transition curve may be equivalent to the starting position of a slope or the starting position of a curve.

Specifically, the curve-starting-position identification part 103 identifies the position of a road sign. The curve-starting-position identification part 103 identifies the starting position of a transition curve with reference to the information representing the relationship of correspondence between the identified position of a road sign and the distance ranging from the identified position to the starting position of a transition curve.

Accordingly, the road information detection device 10 is able to simply and accurately identify the starting position of a slope or a curve.

Second Embodiment

A road information detection device according to the second embodiment of the present invention will be described below.

As shown in FIG. 2, the road information detection device 10 of the second embodiment includes an image information capture part 101, an attached-structure detection part 102, the curve-starting-position identification part 103, a storage media 104, and a notification part 105.

The image information capture part 101 captures images. For example, the image information capture part 101 is configured of a camera.

The attached-structure detection part 102 detects an identification of an attached structure reflected in an image captured by the image information capture part 101. For example, the identification of an attached structure representing a road sign may indicate characters "80" denoted by a sign showing the speed limit of 80 km/h. In addition, the identification of an attached structure representing a distance post may indicate characters "114.7" denoted by a distance post showing the distance measured from the starting point of each highway. Moreover, the identification of an attached structure representing an ETC gantry may indicates the name of each interchange of roads.

The curve-starting-position identification part 103 identifies the starting position of a transition curve in a road structure upon detecting an attached structure on road.

Specifically, the curve-starting-position identification part 103 identifies the starting position of a transition curve based on the identification of an attached structure reflected in an image captured by the image information capture part 101, the position of an attached structure recorded on a first data table TBL1 which will be discussed later, and the distance between the position of an attached structure to the starting position of a transition curve.

The curve-starting-position identification part 103 calculates the distance ranging from a vehicle to an attached structure being detected based on an image reflecting the identification of an attached structure.

The curve-starting-position identification part 103 adds the calculated distance between a vehicle and an attached structure reflected in an image to the distance between the starting position of a transition curve and an attached structure identified on the first data table TBL1.

The storage media 104 stores various pieces of information required for the processing of the road information detection device 10.

For example, the storage media 104 stores the relationship of correspondence between the image information showing the identification of an attached structure shown in FIG. 3 and the distance between the setup position of an attached structure and the starting position of a transition curve on the first data table TBL1.

The notification part 105 notifies the starting position of a transition curve identified by the curve-starting-position identification part 103. For example, the notification part 105 may represent a display, a speaker, a vibrator, a light-emitting member, or the like.

The processing of the road information detection device 10 according to the second embodiment will be described below.

Herein, the following description refers to a processing flow of the road information detection device 10, as shown in FIG. 2, installed on a vehicle running on a highway.

In this connection, the attached-structure detection part 102 may read the identification of an attached structure on the first data table TBL1 from the storage media 104 in advance upon starting the road information detection device 10. Upon starting the road information detection device 10, the curve-starting-position identification part 103 may read the first data table TBL1 from the storage media 104 in advance.

The image information capture part 10 captures an image in the running direction of a vehicle currently running on a highway (step S1).

The image information capture part 101 transmits the image information, representing the captured image, to the attached-structure detection part 102.

The attached-structure detection part 102 receives the image information from the image information capture part 101.

Upon receiving the image information, the attached-structure detection part 102 determines whether or not the identification of an attached structure, which was read in advance, can be detected in an image indicated by the received image information (step S2).

The identification of an attached structure corresponding to a road sign, which was read in advance, may indicate characters "80" of a sign showing the speed limit of 80 km/h. In addition, the identification of an attached structure corresponding to a distance post, which was read in advance, may indicate characters "114.7" of a distance post showing the distance from the starting point of each highway. Moreover, the identification of an attached structure corresponding to an ETC gantry, which was read in advance, may indicate the name of each interchange of roads.

For example, the attached-structure detection part 102 compares an image corresponding to the received image information with an image showing the identification of an attached structure, which may describe the circled characters "80", by use of the matching technology of image processing, thus determining whether or not the circled characters "80" can be detected in an image corresponding to the received image information.

Similarly, by use of the matching technology, the attached-structure detection part 102 compares an image corresponding to the received image information with an image showing the identification of an attached structure, which may describe the characters "114.7", thus determining whether or not the characters "114.7" can be detected in an image corresponding to the received image information.

Similarly, by use of the matching technology, the attached-structure detection part 102 compares an image corresponding to the received image information with an image indicating the identification of an attached structure, which may show the characters "Kasama-Nishi", e.g. an example of an interchange's name described on an ETC gantry, thus determining whether or not the characters "Kasama-Nishi" can be detected in an image corresponding to the received image information.

The processing may return to step S1 when the attached-structure detection part 102 does not determine to detect any identification that matches the identification for each of attached structures, which are read from the storage media 104 in advance, (i.e. NO in step S2).

When the attached-structure detection part 102 determines to detect an identification that matches one of identifications of attached structures, which are read from the storage media 104 in advance, in an image corresponding to the received image information (i.e. YES in step S2), it sends the detected identification of an attached structure and an image indicating the detected identification of an attached structure to the curve-starting-position identification part 103.

The curve-starting-position identification part 103 receives the detected identification of an attached structure and the image indicating the detected identification of an attached structure from the attached-structure detection part 102.

Upon receiving the identification of an attached structure and the image for successfully detecting the identification of an attached structure, the curve-starting-position identification part 103 identifies the starting position of a transition curve according to a road structure upon detecting an attached structure on road (step S3).

For example, the curve-starting-position identification part 103 identifies the distance ranging from an attached structure, corresponding to the received identification of an attached structure, to the starting position of a transition curve on the first data table TBL1 (step S3A).

In addition, the curve-starting-position identification part 103 calculates the distance from a vehicle to an attached structure detected based on an image indicating the detected identification of an attached structure (step S3B).

The method how to calculate the distance from a vehicle to an attached structure having the detected identification will be described with reference to a concrete example in which the curve-starting-position identification part 103 detects a road sign showing the speed limit of 80 km/h.

In the above, the image information capture part 101 is installed such that the center of an angle of view (or a viewing angle) is horizontal to the road surface at the position of a vehicle having the height of 1.2 m above the road surface. In this connection, road signs serving as attached structures are subject to installation criterion, determining standard heights of installation. Herein, the center of an identification of each road sign may be installed at the height of 1.8 m above the road surface. In addition, a viewing angle of the image information capture part 101 may be set to 48 degrees.

Figure 5:
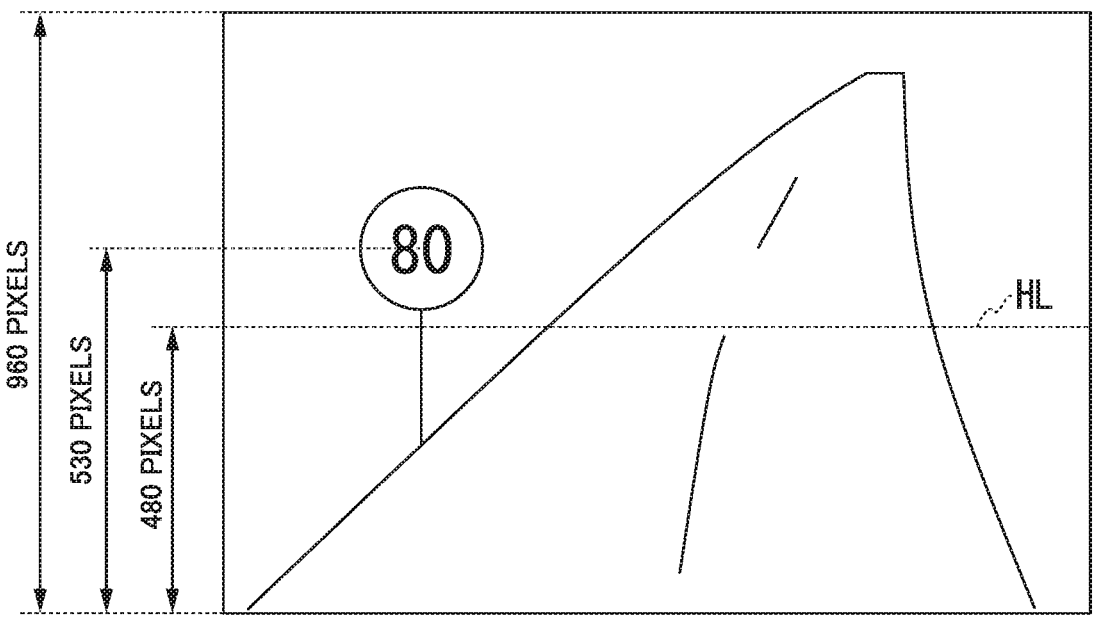
FIG. 5 is a drawing showing an example of an image of detecting an identification of an attached structure according to the second embodiment.

The curve-starting-position identification part 103 receives an image shown in FIG. 5 as an image indicating the detected identification of an attached structure from the attached-structure detection part 102. As shown in FIG. 5, the number of pixels in a vertical direction counted from the lowermost part to the uppermost part in an image indicating the detected identification of an attached structure is set to 960 pixels. In addition, the number of pixels in a vertical direction counted from the lowermost part of an image indicating the detected identification of an attached structure to the center of the identification of an attached structure is set to 530 pixels. Moreover, the number of pixels in a vertical direction counted from the lowermost part of an image indicating the detected identification of an attached structure to a horizontal line HL is set to 480 pixels.

Figure 6:
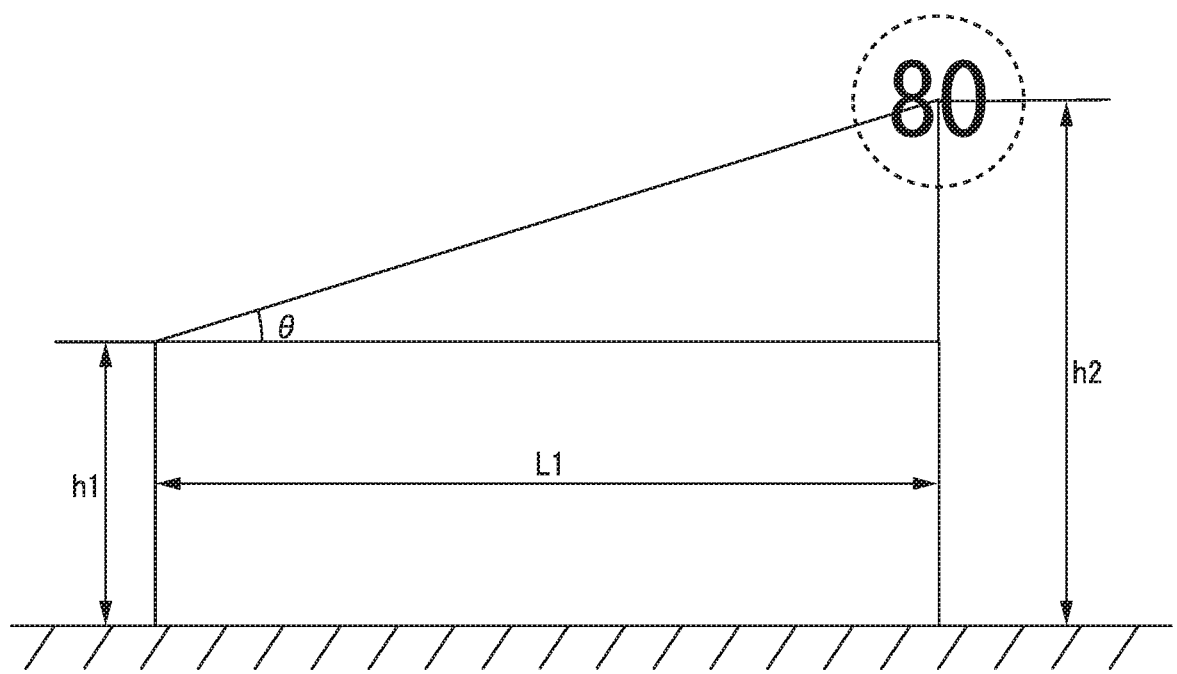
FIG. 6 is a schematic view showing the positional relationship between an attached structure and an image information capture part mounted on a vehicle according to the second embodiment.

The positional relationship shown in FIG. 6 is established between an attached structure and the image information capture part 101 installed on a vehicle, wherein the distance L1 can be expressed using the height h1, the height h2, and the angle θ according to the equation (1) as follows.

$$L1=(h2-h1) \div \tan \theta \quad (1)$$

Herein, the distance L1 indicates the distance measured from an attached structure to the image information capture part 101 installed on a vehicle. The height h1 indicates the height of the installed position of the image information capture part 101. The height h2 indicates the height of the center of the identification of an attached structure above the road surface. The angle θ indicates the angle formed between the horizontal direction and the line segment connected between the image information capture part 101 and the center of the identification of an attached structure when the horizontal direction is set to zero degrees based on the reference point corresponding to the position of the image information capture part 101.

It is known in advance that the height h1 is 1.2 m while the height h2 is 1.8 m. Therefore, it is possible to calculate the distance L1 upon determining the angle θ.

It is known that the angle of the image information capture part 101 is set to 48 degrees. In addition, it is known that the number of pixels in a vertical direction counted from the upper most part to the lowermost part of an image indicating the detected identification of an attached structure is set to 960 pixels. Therefore, it is possible to calculate one pixel in a vertical direction as 0.05 degrees (=48÷960) in an image indicating the detected identification of an attached structure.

It is known that the number of pixels in a vertical direction counted from the lowermost part of an image to the center of the identification of an attached structure is set to 530 pixels. In addition, it is known that the number of pixels in a vertical direction counted from the lowermost part of an image indicating the detected identification of an attached structure to the horizontal line HL is set to 480 pixels. It is possible to calculate 50 (=530−480) pixels as the difference regarding the number of pixels in a vertical direction between the number of pixels in a vertical direction counted from the lowermost part of an image to the center of the identification of an attached structure and the number of pixels in a vertical direction counted from the lowermost part of an image indicating the detected identification of an attached structure to the horizontal line HL.

The angle θ indicates an angle for 50 pixels corresponding to the difference regarding the number of pixels in a vertical direction counted from the lowermost part of an image indicating the detected identification of an attached structure to the horizontal line HL, and therefore it is possible to calculate θ=2.5 (=0.05×50) degrees.

Therefore, the curve-starting-position identification part 103 calculates the distance L1 as L1≅13.74(=(1.8−1.2)÷tan 2.5) meters according to the equation (1).

In this connection, the curve-starting-position identification part 103 may calculate the distance L1 using a different algorithm than the above algorithm. For example, the curve-starting-position identification part 103 may calculate the distance L1 according to an algorithm using a pinhole camera model disclosed by "Shuhei Takimoto, Tadaaki Ito, "Development of Monocular Distance Measurement Verification System Using On-Vehicle Camera". SEI Technical Review, 169 Issue, pp. 82-87" or the like. In addition, the curve-starting-position identification part 103 may use other distance-calculating algorithms if they can appropriately calculate the distance L1.

The curve-starting-position identification part 103 may calculate the distance L1 based on the positional information of an attached structure, which was obtained in advance, and the position of a vehicle identified by GPS (Global Positioning System). Specifically, the curve-starting-position identification part 103 calculates the distance corresponding to the difference between the position of an attached structure and the position of a vehicle identified by GPS.

Alternatively, the curve-starting-position identification part 103 may calculate the distance L1 based on a beacon signal transmitted by an attached structure. Specifically, the curve-starting-position identification part 103 retrieves the relationship of correspondence between distances and radio-field intensities of beacon signals in advance, thus indicating the distance corresponding to the radio-field intensity of the received beacon signal with reference to the relationship of correspondence.

In addition, the curve-starting-position identification part 103 may calculate the distance L1 based on the positional information of an attached structure, which was obtained in advance, and the running distance of a vehicle calculated based on the number of revolutions of wheels. Specifically, the curve-starting-position identification part 103 may calculate the running distance by multiplying the number of revolutions of wheels, started at an interchange of roads, by the circumferential length of each wheel. That is, the curve-starting-position identification part 103 calculates the distance corresponding to the difference between the position of an attached structure and the position indicated by the running distance started at an interchange of roads.

The curve-starting-position identification part 103 adds the calculated distance between a vehicle and an attached structure to the distance from an attached structure to the starting position of a transition curve identified on the first data table TBL1 (step S3C).

The curve-starting-position identification part 103 transmits the calculated distance between a vehicle and an attached structure to the notification part 105.

The notification part 105 receives the distance between a vehicle and an attached structure from the curve-starting-position identification part 103.

Upon receiving the distance between a vehicle and an attached structure, the notification part 105 notifies the starting position of a transition curve based on the received distance (step S4).

Figure 7:
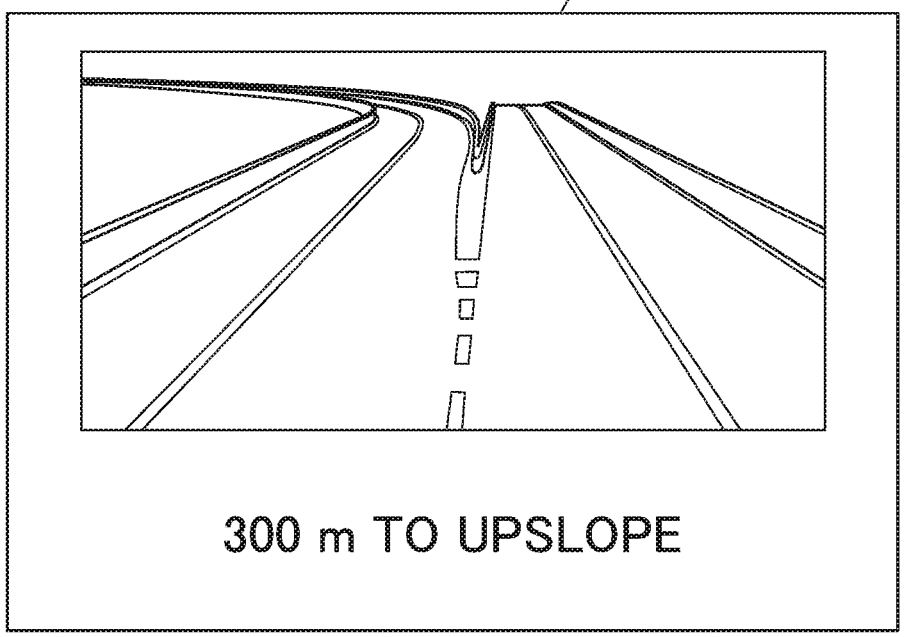
FIG. 7 is a drawing showing an example of a notification part according to the second embodiment.

When the starting position of a transition curve indicates the starting position of an upslope, for example, the notification part 105 configured of a display may display characters "300 m To Upslope" together with an image captured by the image information capture part 101 as shown in FIG. 7. Alternatively, when the starting position of a transition curve indicates the starting position of an upslope, the notification part 105 configured of a speaker may produce sound of "300 m To Upslope". In addition, the notification part 105 configured of a vibrator may vibrate a seating sheet at intervals of time or with intensity of vibration depending on the distance from a vehicle to the starting position of a transition curve. Moreover, the notification part 105 configured of a light-emitting member may emit light at intervals of flashing or with intensity of light depending on the distance from a vehicle to the starting position of a transition curve.

Heretofore, the road information detection device 10 has been described according to the second embodiment of the present invention.

The road information detection device 10 of the second embodiment includes the image information capture part 101, the attached-structure detection part 102, the curve-starting-position identification part 103, the storage media 104, and the notification part 105.

The image information capture part 101 captures images. The attached-structure detection part 102 detects the identification of an attached structure reflected in an image captured by the image information capture part 101. The curve-starting-position identification part 103 identifies the starting position of a transition curve based on an attached structure on road detected according to the road structure. Specifically, the curve-starting-position identification part 103 identifies the starting position of a transition curve based on the identification of an attached structure reflected in an image captured by the image information capture part 101, the position of an attached structure recorded on the first data table TBL1, and the distance between the attached structure and the starting position of the transition curve.

In addition, the curve-starting-position identification part 103 calculates the distance between a vehicle and an attached structure detected based on an image indicating the detected identification of an attached structure. The curve-starting-position identification part 103 adds the calculated distance between a vehicle and an attached structure to the distance between an attached structure and the starting position of a transition curve identified on the first data table TBL1.

The storage media 104 stores various pieces of information required for the processing of the road information detection device 10. The notification part 105 notifies the starting position of a transition curve identified by the curve-starting-position identification part 103.

Accordingly, it is possible for the road information detection device 10 to simply and accurately identify the starting position of a slope or a curve on road.

Third Embodiment

A road information detection device according to the third embodiment of the present invention will be described below.

Similar to the road information detection device 10 of the second embodiment shown in FIG. 2, the road information detection device 10 of the third embodiment includes the image information capture part 101, the attached-structure detection part 102, the curve-starting-position identification part 103, the storage media 104, and the notification part 105.

The attached-structure detection part 102 repeatedly detects the identification of an attached structure reflected in an image captured by the image information capture part 101 a predetermined number of times. For example, the predetermined number of times is set to the number of times by which the road where a vehicle is currently running can be discriminated from other roads. Alternatively, the predetermined number of times is set to the number of times by which the current position of a road where a vehicle is currently running can be discriminated from other positions of a road where a vehicle is currently running.

The curve-starting-position identification part 103 identifies the starting position of a transition curve based on attached structures detected on a road according to the road structure.

Specifically, the curve-starting-position identification part 103 detects the order of attached structures reflected in images captured by the image information capture part 101. The curve-starting-position identification part 103 identifies the starting position of a transition curve based on the identification of an attached structure lastly detected by the attached-structure detection part 102, the position of an attached structure recorded on a second data table TBL2 which will be discussed later, and the distance between the attached structure and the starting position of the transition curve.

The storage media 104 stores various pieces of information required for the processing of the road information detection device 10.

As shown in FIG. 8, for example, the storage media 104 stores the relationship of correspondence between the image information showing identifications of attached structures, which are aligned in the order of attached structures sequentially emerging as a vehicle is running on road, and the distance information indicating the distance between the installed position of the last attached structure among attached structures and the starting position of a transition curve on the second data table TBL2.

In this connection, the present embodiment may produce a single second data table TBL2 with respect to a downward direction from a starting point to an ending point or an upward direction from an ending point to a starting point; hence, it is possible to reverse the order of reading data from the second data table TBL2 with respect to the upward and downward directions. When the function part uses the second data table TBL2 for the upward direction shown in FIG. 8, for example, it may read data in the order from No. 1 to No. 100 with respect to a vehicle running in the upward direction. Alternatively, the function part, which uses the second data table TBL2 for the upward direction shown in FIG. 8, may read data in the order from No. 100 to No. 1 with respect to a vehicle running in the downward direction.

Upon detecting the identification of a single and specific attached structure, the road information detection device 10 of the second embodiment is able to calculate the distance between a vehicle and the starting position of a transition curve based on the distance between the attached structure and the starting position of the transition curve. However, the same identification of an attached structure may exist on other roads or at other positions of the same road. In this case, the road information detection device 10 according to the second embodiment of the present invention is unable to discriminate whether the detected identification of an attached structure indicates the identification of an attached structure on a road where a vehicle is currently running, the identification of an attached structure on another road, or the identification of an attached structure at another position of a road where a vehicle is currently running. As a result, the road information detection device 10 according to the second embodiment of the present invention is unable to calculate the distance between a vehicle and the starting position of a transition curve when the same identification of an attached structure may exist on other roads or at other positions of the same road.

In contrast, the road information detection device 10 according to the third embodiment of the present invention is able to calculate the distance between a vehicle and the starting position of a transition curve even when the same identification of an attached structure may exist on other roads or at other positions of the same road.

The processing of the road information detection device 10 according to the third embodiment of the present invention will be described below.

Figure 9:
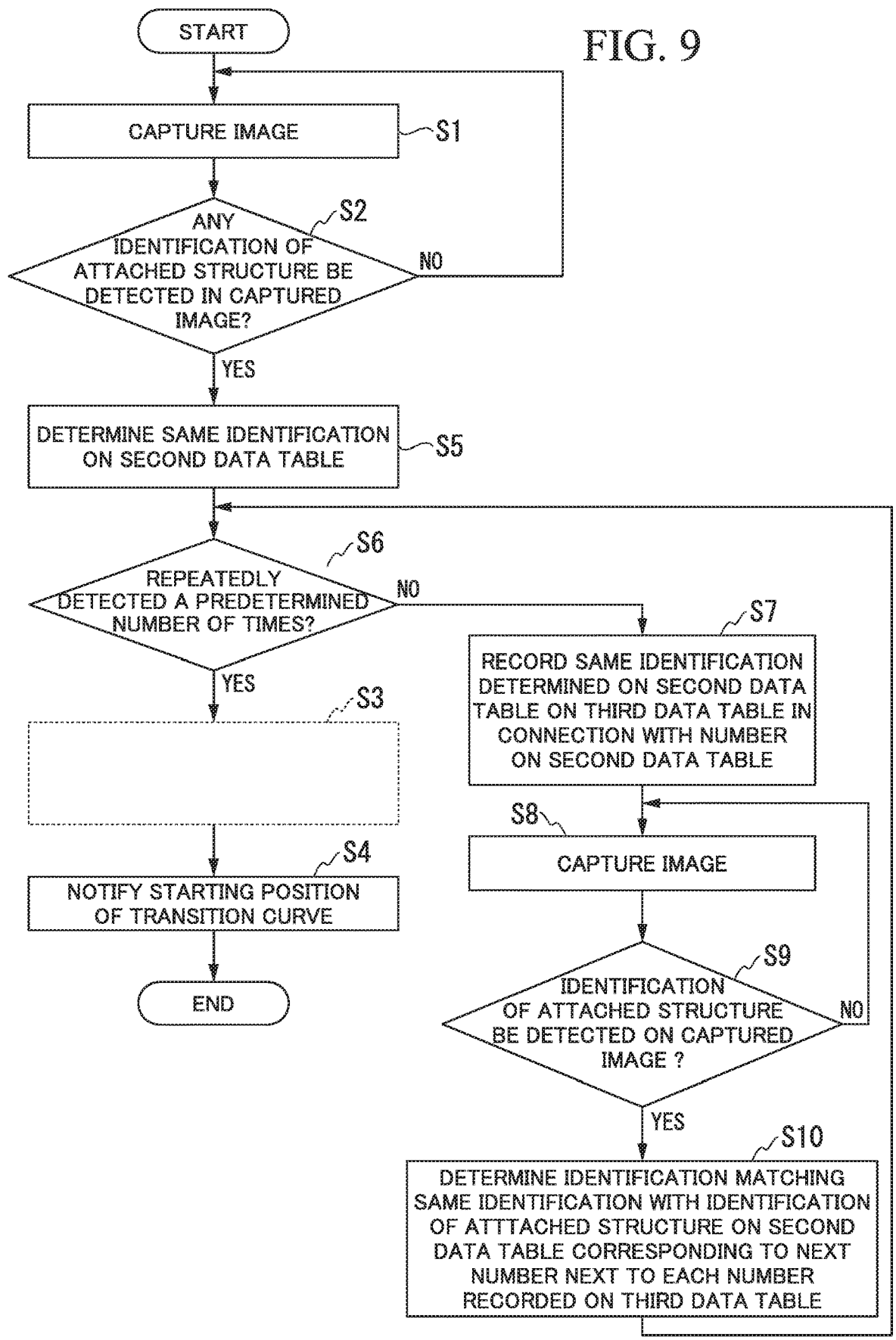
FIG. 9 is a flowchart showing a processing flow of a road information detection device according to the third embodiment.

As shown in FIG. 9, the processing flow will be described with respect to the road information detection device 10 installed on a vehicle that is running on a highway. Herein, the step S3 of this processing flow is identical to the foregoing step S3 of the processing flow shown in FIG. 4.

At the starting of the road information detection device 10, the attached-structure detection part 102 reads identifications of attached structures on the second data table TBL2 from the storage media 104 in advance. At the starting of the road information detection device 10, the curve-starting-position identification part 103 reads the second data table TBL2 from the storage media 104 in advance.

In this connection, it is assumed that a vehicle is running in an upward direction on a road.

After executing step S1, the image information capture part 101 transmits the image information of the captured image to the attached-structure detection part 102.

The attached-structure detection part 102 receives the image information from the image information capture part 101.

Upon receiving the image information, the attached-structure detection part 102 determines whether or not the identification of an attached structure, which was read in advance, can be detected in an image corresponding to the received image information (step S2).

The processing returns to step S1 when the attached-structure detection part 102 determines not to detect the same identification that matches the identification of an attached structure, which was read in advance, in an image corresponding to the received image information (i.e. NO in step S2).

Upon determining to detect the same identification that matches the identification of an attached structure, which was read in advance, in an image of the received image information (i.e. YES in step S2), the attached-structure detection part 102 identifies the same identification, which is determined to match the identification of an attached structure, on the second data table TBL2 (step S5).

The attached-structure detection part 102 determines whether or not the identification of an attached structure reflected in an image captured by the image information capture part 101 has been repeatedly detected a predetermined number of times (step S6).

When the attached-structure detection part 102 determines that the identification of an attached structure reflected in an image captured by the image information capture part 101 has not been repeatedly detected a predetermined number of times (i.e. NO in step S6), it records the same identification, which is identified on the second data table TBL2 in step S5, on a third data table TBL3 of the storage media 104 in connection with its corresponding number (No.) on the second data table TBL2 (step S7).

The attached-structure detection part 102 sends to the image information capture part 101 a recording notification signal notifying that the same identification identified on the second data table TBL2 in step S5 has been recorded on the storage media 104 in connection with its corresponding number on the second data table TBL2.

The image information capture part 101 receive the recording notification signal from the attached-structure detection part 102.

Upon receiving the recording notification signal, the image information capture part 101 captures an image of a vehicle in its running direction when the vehicle is running on a highway (step S8).

The image information capture part 101 sends the image information corresponding to the captured image to the attached-structure detection part 102.

The attached-structure detection part 102 receives the image information from the image information capture part 101.

Upon receiving the image information, the attached-structure detection part 102 determines whether or not the identification of an attached structure, which was read in advance, can be detected in an image corresponding to the received image information (step S9).

The processing returns to step S8 when the attached-structure detection part 102 determines that the same identification, which matches the identification of an attached structure read from the storage media 104 in advance, cannot be detected in an image of the received image information (i.e. NO in step S9).

When the attached-structure detection part 102 determines that the same identification, which matches the identification of an attached structure read from the storage media 104 in advance, can be detected in an image of the received image information (i.e. YES in step S9), it reads the third data table TBL3 from the storage media 104.

Upon reading the third data table TBL3, the attached-structure detection part 102 identifies an identification that matches the same identification, which is detected to match the identification of an attached structure in step S9, with respect to the identification of an attached structure on the second data table TBL2 in correspondence with the next number next to each of numbers recorded on the third data table TBL3 (step S10). The attached-structure detection part 102 reverts the processing to step S6.

In addition, when the attached-structure detection part 102 determines that the identification of an attached structure reflected in an image captured by the image information capture part 101 can be repeatedly detected a predetermined number of times (i.e. YES in step S6), it sends to the curve-starting-position identification part 103 the lastly detected identification of an attached structure and an image for successfully detecting the identification of an attached structure.

The curve-starting-position identification part 103 receives from the attached-structure detection part 102 the identification of an attached structure, which was lastly detected by the attached-structure detection part 102, and an image for successfully detecting the identification of an attached structure.

Upon receiving the identification of an attached structure, which was lastly detected by the attached-structure detection part 102, and an image for successfully detecting the identification of an attached structure, the curve-starting-position identification part 103 identifies the starting position of a transition curve according to the road structure upon detecting an attached structure on road when it receives the identification of an attached structure, which was detected lastly by the attached-structure detection part 102 and an image for successfully detecting the identification of an attached structure lastly detected by the attached-structure detection part 102 in step S3.

The road information detection device 10 carries out the process of step S4.

A concrete example regarding YES in step S2, S5, NO in step S6, and S7 through S10 in the processing flow shown in FIG. 9 will be described with respect to a method how to identify identifications on the second data table TBL2 shown in FIG. 8.

The attached-structure detection pan 102 may determines that an identification, which matches an identification dt1 of an attached structure read from the storage media 104 in advance, can be detected in an image corresponding to the received image information in step S2 (i.e. YES in step S2). In this case, the attached-structure detection part 102 specifies the identification dt1 of an attached structure at No. 31 and the identification dt1 of an attached structure at No. 61 o the second data table TBL2 in step S5.

The attached-structure detection part 102 cannot specify one identification since the identification dt1 of an attached structure exists in three records of the second data table TBL2 at No. 1. No. 31, and No. 61, and therefore it determines that the identification of an attached structure reflected in an image captured by the image information capture part 101 cannot be repeatedly detected a predetermined number of times in step S6 (i.e. NO in step S6).

The attached-structure detection part 102 records the identification dt1 of an attached structure in connection with its number, i.e. No. 1, on the third data table TBL3 of the storage media 104 in step S7. In addition, the attached-structure detection part 102 records the identification dt1 of an attached structure in connection with its number, i.e. No. 31, on the third data table TBL3 of the storage media 104 in step S7. Moreover, the attached-structure detection part 102 records the identification dt1 of an attached structure in connection with its number, i.e. No. 61, on the third data table TBL3 of the storage media 104 in step S7.

The attached-structure detection part 102 sends to the image information capture part 101 a recording notification signal notifying that the identification dt1 of an attached structure and its corresponding number No. 1, the identification dt1 of an attached structure and its corresponding number No. 31, and the identification of an attached structure and its corresponding number No. 61 are recorded on the third data table TBL3 of the storage media 104.

The image information capture part 101 receives the recording notification signal from the attached-structure detection part 102.

Upon receiving the recording notification signal, the image information capture part 101 captures an image of a vehicle in its running direction when the vehicle is running on a highway in step S8.

The image information capture part 101 sends the image information of the captured image to the attached-structure detection part 102.

The attached-structure detection part 102 receives the image information from the image information capture part 101.

Upon receiving the image information, the attached-structure detection part 102 determines whether or not the identification of an attached structure, which was read in advance, can be detected in an image corresponding to the received image information in step S9.

The processing returns to step S8 when the attached-structure detection part 102 determines that any one identification, which matches the identification of an attached structure read from the storage media 104 in advance, can be detected in an image of the received image information in step S9 (i.e. NO in step S9).

The attached-structure detection part 102 reads the third data table TBL3 from the storage media 104 when it determines that the identification dt2 of an attached structure, which matches the identification of an attached structure read from the storage media 104 in advance, can be detected in an image of the received image information in step S9 (i.e. YES in step S9).

Upon reading the third data table TBL3, the attached-structure detection part 102 specifies an identification, which matches the identification dt2 of an attached structure, as the identification dt2 of an attached structure at No. 2 among identifications of attached structures on the second data table TBL2 in correspondence with their numbers No. 2, No. 32, and No. 62 next to No. 1, No. 31, and No. 61 on the third data table TBL3 in step S9. The attached-structure detection part 102 reverts the processing to step S6.

The attached-structure detection part 102 determines that the identification of an attached structure reflected in an image captured by the image information capture part 101 can be repeatedly detected a predetermined number of times in step S6 (i.e. YES in step S6) since it specifies a single identification, i.e. the identification dt2 of an attached structure at No. 2, which matches the identification dt2 of an attached structure. The attached-structure detection part 102 sends to the curve-starting-position identification part 103 the identification dt2 of an attached structure at No. 2, which was detected last, and an image for successfully detecting the identification of an attached structure.

Heretofore, the road information detection device 10 has been described according to the third embodiment of the present invention.

The road information detection device 10 of the third embodiment includes the image information capture part 101, the attached-structure detection part 102, the curve-starting-position identification part 103, the storage media 104, and the notification part 105. The image information capture part 101 captures images. The attached-structure detection part 102 repeatedly detects the identification of an attached structure reflected in an image captured by the image information capture part 101 a predetermined number of times.

The curve-starting-position identification part 103 identifies the starting position of a transition curve upon detecting an attached structure on road according to the road structure. Specifically, the curve-starting-position identification part 103 detects the order of attached structures reflected in images captured by the image information capture part 101. The curve-starting-position identification part 103 identifies the starting position of a transition curve based on the identification of an attached structure, which was lastly detected by the attached-structure detection part 102, the position of an attached structure recorded on the second data table TBL2, and the distance between the attached structure and the starting position of the transition curve. The storage media 104 stores various pieces of information required for the processing of the road information detection device 10. The notification part 105 notifies the starting position of a transition curve identified by the curve-starting-position identification part 103.

Accordingly, it is possible for the road information detection device 10 to simply and accurately identify the starting position of a slope or a curve on a road.

Fourth Embodiment

A road information detection system will be described according to the fourth embodiment of the present invention.

As shown in FIG. 10, a road information detection system 1 according to the fourth embodiment of the present invention includes the road information detection device 10, which further includes an output part 106, and a driving assistance device 20.

For example, the road information detection device 10 further including the output part 106 is equivalent to the road information detection device 10 according to any one of first to third embodiments further including the output part 106.

The output part 106 outputs the starting position of a transition curve identified by the curve-starting-position identification part 103 to the driving assistance device 20.

As shown in FIG. 11, the driving assistance device 20 includes a starting-position acquisition part 201 and a driving control part 202.

The starting-position acquisition part 201 acquires the starting position of a transition curve from the road information detection device 10.

The driving control part 202 controls a vehicle to accelerate based on the starting position of a transition curve acquired by the starting-position acquisition part 201.

The driving control part 202 controls a vehicle to brake based on the starting position of a transition curve acquired by the starting-position acquisition part 201.

The driving control part 202 controls a vehicle to change its running direction based on the starting position of a transition curve acquired by the starting-position acquisition part 201.

The processing of the road information detection system 1 of the fourth embodiment will be described below.

Figure 12:
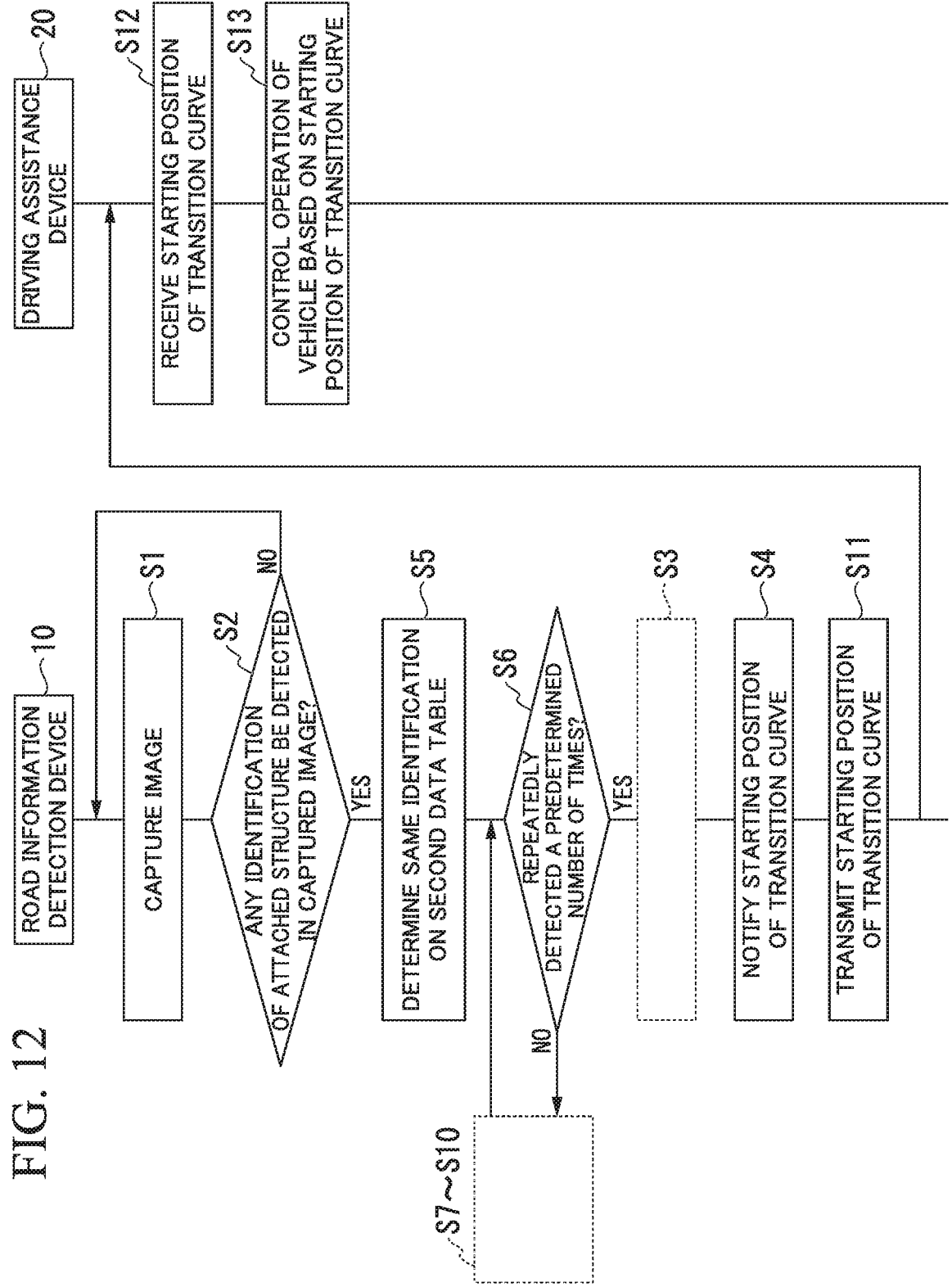
FIG. 12 is a flowchart showing a processing flow of the road information detection system according to the fourth embodiment.

The following description refers to a processing flow of the road information detection device 10 shown in FIG. 12, which is installed on a vehicle that is running on a highway.

In the processing flow shown in FIG. 12, a series of steps S1 through S10 are identical to those of the processing flow shown in FIG. 9.

The curve-starting-position identification part 103 sends the distance calculated between a vehicle to an attached structure to the notification part 105 and the output part 106.

The notification part 105 receives the distance between a vehicle and an attached structure from the curve-starting-position identification part 103.

Upon receiving the distance between a vehicle and an attached structure, the notification part 105 notifies the starting position of a transition curve based on the received distance.

The output part 106 receives the distance between a vehicle and an attached structure from the curve-starting-position identification part 103.

Upon receiving the distance between a vehicle and an attached structure, the output part 106 transmits to the driving assistance device 20 the starting position of a transition curve based on the received distance (step S11).

The starting-position acquisition part 201 receives the starting position of a transition curve from the road information detection device 10 (step S12).

Upon receiving the starting position of a transition curve, the starting-position acquisition part 201 transmits the received starting position of a transition curve to the driving control part 202.

The driving control part 202 receives the starting position of a transition curve from the starting-position acquisition part 201.

Upon receiving the starting position of a transition curve, the driving control part 202 automatically controls a vehicle to run based on the received starting position of a transition curve (step S13).

Specifically, the driving control part 202 controls a vehicle to accelerate when the starting position of a transition curve indicates the starting position of an upslope.

The driving control part 202 controls a vehicle to brake when the received starting position of a transition curve indicates the starting position of a downslope. In this connection, it is possible to generate electric power using regenerative braking on a vehicle equipped with a motor.

The driving control part 202 controls a vehicle to change its running direction when the received starting position of a transition curve indicates the starting position of a curve.

Heretofore, the road information detection system 1 has been described according to the fourth embodiment of the present invention.

The road information detection system 1 of the fourth embodiment includes the road information detection device 10 further including the output part 106, and the driving assistance device 20.

The output part 106 outputs the starting position of a transition curve, which is identified by the curve-starting-position identification part 103, to the driving assistance device 20. The driving assistance device 20 includes the starting-position acquisition part 201 and the driving control part 202.

The starting-position acquisition part 201 acquires the starting position of a transition curve from the road information detection device 10. The driving control part 202 controls a vehicle to accelerate based on the starting position of a transition curve acquired by the starting-position acquisition part 201. In addition, the driving control part 202 controls a vehicle to brake based on the starting position of a transition curve acquired by the starting-position acquisition part 201. Moreover, the driving control part 202 controls a vehicle to change its running direction based on the starting position of a transition curve acquired by the starting-position acquisition part 201.

Accordingly, it is possible for the road information detection device 10 of the road information detection system 1 to simply and accurately identify the starting position of a slope or a curve. In addition, it is possible for the driving assistance device 20 to assist the driving of a vehicle based on the accurate starting position of a slope or a curve identified by the road information detection device 10.

In the road information detection system 1, it is possible for the road information detection device 10 to acquire the information regarding the presumed speed at the design of roads so that the driving assistance device 20 can control a vehicle to run at the presumed speed. In this connection, the driving assistance device 20 may automatically control the speed of a vehicle.

Accordingly, it is possible to control vehicles to run safely on roads according to the road information detection system 1.

It is possible to carry out a series of step S1 through S4 in the processing flow shown in FIG. 4 instead of a series of step S1 through S10 in the processing flow shown in FIG. 12.

In the foregoing embodiments of the present invention, the curve-starting-position identification part 103 may estimate the distance from the position to start counting the number of white lines by counting the number of white lines.

For example, it is known that the standard length of each while line on a highway is 8 m while the standard interval between white lines is 12 m.

Using the image recognition technology of image processing, the curve-starting-position identification part 103 counts the number of white lines emerging in images captured by the image information capture part 101. The curve-starting-position identification part 103 is able to estimate the distance from the position to start counting the number of white lines in units of 20 m upon multiplying 20 m (=8 m representing the length for each white line+12 m representing each interval between white lines) by the number of times white lines emerge on road.

Accordingly, it is possible for the road information detection device 10 to simply and accurately identify the starting position of a slope or a curve on a road.

In the foregoing embodiments of the present invention, attached structures on roads may be configured of emergency telephone booths. It is known that emergency telephone booths are equipped with lights displaced at intervals of distance of about 1 km while those lights are displaced in tunnels at intervals of distance of 200 m (e.g. lights are displaced on metropolitan expressways at intervals of distance of 500 m while they are displayed in tunnels at intervals of distance of 100 m).

Using the image recognition technology of image processing, the curve-starting-position identification part 103 counts the number of times lights emerge and/or the number of times emergency telephone booths emerge in tunnels with respect to images captured by the image information capture part 101. Similar to counting the number of white lines, the curve-starting-position identification part 103 can estimate the distance from the position to start counting the number of times lights emerge and/or the number of times emergency telephone boots emerge in tunnels upon multiplying the number of times lights emerge and/or the number of times emergency telephone booths emerge in tunnels by the interval of distance between lights and/or the interval of distance between emergency telephone booths in tunnels.

Accordingly, it is possible for the road information detection device 10 to simply and accurately identify the starting position of a slope or a curve on a road.

Similar to the above examples for estimating distances by counting the number of white lines or the number of emergency telephone booths, it is possible for the curve-starting-position identification part 103 according to the foregoing embodiments of the present invention to estimate the distance from the position to start counting the number of distance posts emerge on road by counting the number of distance posts on road (wherein large-size distance posts are displaced at the interval of distance of 500 m while small-size distance posts are displaced at the interval of distance of 100 m).

Accordingly, it is possible for the road information detection device 10 to simply and accurately identify the starting position of a slope or a curve on a road.

In the foregoing embodiments of the present invention, the attached-structure detection part 102 may detect delta-shaped white lines at branches or joints of highways as attached structures on roads. The curve-starting-position identification part 103 is able to estimate the current position of a vehicle by comparing the order of delta-shaped white lines that emerges while a vehicle is running with the order of delta-shaped white lines emerging on road which is recorded on the storage media 104 in advance.

Accordingly, it is possible for the road information detection device 10 to simply and accurately identify the starting position of a slope or a curve on a road.

In the foregoing embodiments of the present invention, the attached-structure detection part 102 may detect destination marks and/or wrong-direction protection marks printed on the surface of roads as attached structures on roads. The curve-starting-position identification part 103 is able to estimate the current position of a vehicle (or its running interval of section) by comparing the order of destination marks and/or wrong-direction protection marks emerging on the surface of roads with the order of destination marks and/or wrong-direction protection marks emerging on the surface of roads which is recorded on the storage media 104 in advance.

Accordingly, it is possible for the road information detection device 10 to simply and accurately identify the starting position of a slope or a curve on a road.

In the foregoing embodiments of the present invention, the road information detection device 10 may further adopt the aforementioned method of accurately identifying the starting position of a slope or a curve.

Accordingly, it is possible for the road information detection device 10 to simply and accurately identify the starting position of a slope or a curve on a road.

In the foregoing embodiments of the present invention, the curve-starting-position identification part 103 may be able to estimate the starting position of a transition curve, irrespective of absence of some attached structures which should be originally located on a road, by estimating an attached structure as follows.

The following description refers to a concrete example for estimating the starting position of a transition curve in the situation where, due to a failure of an attached structure at No. 4, there exist only four attached structures among five attached structures at No. 1 through No. 5 which should be originally located on a road. In this connection, a vehicle is running in a direction from an attached structure at No. 1 to an attached structure at No. 5.

FIG. 13 shows a fourth data table TBL4 showing attached structures at No. 1 through No. 5 with their intervals (or distances), which should be retrieved and recorded in advance.

The attached-structure detection part 102 sequentially detects attached structures at No. 1, No. 2, No. 3, and No. 5 while a vehicle is running on a road.

Every time the attached-structure detection part 102 detects each of attached structures while a vehicle is running on a road, the curve-starting-position identification part 103 acquires an interval of distance between an attached structure previously detected and an attached structure currently detected.

For example, the curve-starting-position identification part 103 calculates an interval of distance between an attached structure previously detected and an attached structure currently detected based on the running distance of a vehicle. In this connection, for example, the curve-starting-position identification part 103 may acquire an interval of distance considering an attached structure at No. 4, which should be originally located on a road, by way of broadcasting or beacon communications from attached structures on road or any other devices located proximate to attached structures on road.

The curve-starting-position identification part 103 may acquire the interval J15 instead of the interval J14, which should be originally acquired, when it calculates an interval of distance between an attached structure previously detected and an attached structure currently detected based on the running distance of a vehicle. Similarly, the curve-starting-position identification part 103 may acquire the interval J25 instead of the interval J24, the interval J35 instead of the interval J34, the interval J51 instead of the interval J41, the interval J53 instead of the interval J42, the interval J53 instead of the interval J43, zero interval instead of the interval J54, and zero interval instead of the interval 45.

However, the curve-starting-position identification part 103 may acknowledge any intervals of distance, which should be acquired while a vehicle is running on a road, on the fourth data table TBL4 when it acquires the interval information on the fourth data table TBL4 in advance. In addition, the curve-starting-position identification part 103 is able to presume a low probability that any intervals of distance, which should be acquired while a vehicle is running on road, may be described on any data tables other than the fourth data table TBL4. For this reason, the curve-starting-position identification part 103 is able to estimate that the fourth attached structure detected by the attached-structure detection part 102 should be an attached structure at No. 5 not the attached structure at No. 4.

In addition, the curve-starting-position identification part 103 is able to acquire the corresponding interval of distance on the fourth data table TBL4 even when it acquires an interval of distance for an attached structure, which should be originally located on a road, by use of broadcasting or beacon communications from any devices located proximate to attached structurers on roads. For this reason, it is possible for the curve-starting-position identification part 103 to estimate that the fourth attached structure detected by the attached-structure detection part 102 should be an attached structure at No. 5 not the attached structure at No. 4.

As described above, the curve-starting-position identification part 103 to estimate attached structures detected by the attached-structure detection part 102 by use of the interval information for attached structures, like the fourth data table TBL4, even when some of attached structures are missing on roads.

In the foregoing embodiments of the present invention, the curve-starting-position identification part 103 may acquire the distance information ranging from an attached structure to the starting position of a transition curve by use of broadcasting or beacon communications from attached structures on roads or any devices located proximate to attached structures on roads.

In addition, it is possible to reduce a memory capacity by storing "10 11 3" as the number of lanes on the storage media 104 when three lanes are laid between the 10-kilometer post and the 1-kilometer post.

In the foregoing embodiments of the present invention, it is possible to change the order of steps in the processing flows as long as appropriate processing can be achieved.

In the foregoing embodiments of the present invention, it is possible to locate the storage media 104 and other storage media at arbitrary positions as long as appropriate transmission/reception of information can be achieved. In addition, it is possible to provide multiple storage media, serving as the storage media 104 and other storage media, for storing data in a distributed manner as long as appropriate transmission/reception of information can be achieved.

In the above descriptions regarding the foregoing embodiments of the present invention, it is possible to provide computer systems inside the road information detection device 10 and the driving assistance device 20. The foregoing processes are stored on computer-readable storage media in the form of programs; hence, the foregoing processes can be achieved with computers for reading and executing programs.

Herein, computer-readable storage media refer to magnetic disks, magneto-optical disks, CD-ROM, DVD-ROM, semiconductor memory, and the like. In addition, it is possible to deliver computer programs to computers through communication lines, and therefore computers may receive and execute programs delivered thereto.

The foregoing programs may achieve part of the foregoing functions. In addition, the foregoing programs may be cast into so-called differential files, i.e. files able to achieve the foregoing functions with combinations of pre-installed programs on computer systems.

In the above descriptions regarding several embodiments of the present invention, the foregoing embodiments are illustrative and therefore do not limit the scope of the invention. That is, it is possible to modify the foregoing embodiments by adding, omitting, replacing, or changing elements without departing from the essence of the invention.

INDUSTRIAL APPLICABILITY

According to the present invention, it is possible to simply and accurately identify the starting position of a slope or a curve on a road.

REFERENCE SIGNS LIST

10 . . . road information detection device
20 . . . driving assistance device
101 . . . image information capture part
102 . . . attached-structure detection part
103 . . . curve-starting-position identification part
104 . . . storage media
105 . . . notification part
106 . . . output part
201 . . . starting-position retrieval part
202 . . . driving control part

The invention claimed is:
1. A road information detection device adapted to a vehicle traveling along a road having a transition curve interposed between a straight portion and an arc portion of the road, the road information detection device comprising:
   at least one memory configured to store computer program code; and
   at least one computer processor configured to execute the computer program code to implement:
      an attached-structure detection part configured to detect an attached structure, the attached structure having:
         an identification; and
         a position of the attached structure on the road; and
      a curve-starting-position identification part configured to identify a starting position of the transition curve associated with the identification of the attached structure by referencing the at least one memory configured to store a table describing an association between the identification of the attached structure and the starting position of the transition curve measured from the attached structure,
wherein the road information detection device further comprises:
a camera configured to capture an image including the attached structure on the road;
wherein, the at least one memory stores a predetermined distance from the position of the attached structure to the starting position of the transition curve in association with the identification of the attached structure,
wherein the attached-structure detection part operates to detect the identification of the attached structure reflected in the image captured by the camera,
wherein the curve-starting-position identification part operates to identify the starting position of the transition curve with reference to the at least one memory using the identification of the attached structure,
wherein the table describes a plurality of numbers indicating a plurality of attached structures having a plurality of identifications sequentially disposed on the road in a traveling direction of the vehicle in association with a plurality of distances each representing the predetermined distance from the position of each attached structure and the starting position of the transition curve,
wherein if the attached-structure detection part detects a first attached structure having a first identification from the image captured by the camera among the plurality of attached structures such that the table describes the first identification indicated by multiple numbers in the plurality of numbers, the processor activates the camera to capture a second image reflecting a second attached structure having a second identification so as to define the second attached structure as a lastly-detected attached structure if the table describes the second identification solely indicated by a single number in the plurality of numbers by updating the multiple numbers, and
wherein the curve-starting-position identification part operates to identify the starting position of the transition curve with reference to the at least one memory using the identification of the lastly-detected attached structure among the plurality of attached structures described by the table, thus determining the predetermined distance associated with the identification of the lastly-detected attached structure.

2. The road information detection device according to claim 1, wherein the curve-starting-position identification part operates to calculate a secondary distance from the vehicle to the attached structure detected based on an image capturing the identification of the attached structure, thus identifying the starting position of the transition curve using an addition of the secondary distance to the predetermined distance.

3. The road information detection device according to claim 1, wherein the curve-starting-position identification part operates to calculate a secondary distance from the vehicle to the attached structure based on the position of the attached structure, and a position of the vehicle identified via a GPS (Global Positioning System), thus identifying the starting position of the transition curve using an addition of the secondary distance to the predetermined distance.

4. The road information detection device according to claim 1, wherein the curve-starting-position identification part operates to calculate a secondary distance from the vehicle to the attached structure according to a radio-field intensity of a beacon signal transmitted from the attached structure, thus identifying the starting position of the transition curve using an addition of the secondary distance to the predetermined distance.

5. The road information detection device according to claim 1, wherein the curve-starting-position identification part operates to calculate a secondary distance from the vehicle to the attached structure based on a difference between the position of the attached structure and a position indicated by a running distance of the vehicle starting from a predetermined position on the road, thus identifying the starting position of the transition curve using an addition of the secondary distance to the predetermined distance.

6. The road information detection device according to claim 1, wherein the at least one computer processor operates to output the starting position of the transition curve to an external device.

7. A road information detection method adapted to a vehicle traveling along a road having a transition curve interposed between a straight portion and an arc portion of the road, the method comprising;
detecting an attached structure having:
an identification; and
a position of the attached structure on the road;
identifying a starting position of the transition curve associated with the identification of the attached structure with reference to a table describing an association between the identification of the attached structure and the starting position of the transition curve measured from the attached structure;
capturing, by a camera, an image including the attached structure on the road;
storing, in at least one memory, a predetermined distance from the position of the attached structure to the starting position of the transition curve in association with the identification of the attached structure;
detecting the identification of the attached structure reflected in the image captured by the camera; and
identifying the starting position of the transition curve with reference to the at least one memory using the identification of the attached structure,
wherein the table describes a plurality of numbers indicating a plurality of attached structures having a plurality of identifications sequentially disposed on the road in a traveling direction of the vehicle in association with a plurality of distances each representing the predetermined distance from the position of each attached structure and the starting position of the transition curve,
wherein the method further comprises, if a first attached structure having a first identification is detected from the image captured by the camera among the plurality of attached structures such that the table describes the first identification indicated by multiple numbers in the plurality of numbers, then activating the camera to capture a second image reflecting a second attached structure having a second identification so as to define the second attached structure as a lastly-detected attached structure if the table describes the second identification solely indicated by a single number in the plurality of numbers by updating the multiple numbers, and
wherein the identifying the starting position of the transition curve with reference to the at least one memory comprises using the identification of the lastly-detected attached structure among the plurality of attached structures described by the table, thus determining the predetermined distance associated with the identification of the lastly-detected attached structure.

8. A non-transitory computer-readable storage medium having a stored program, which if executed, causes a computer to implement a method comprising:
  detecting an attached structure having:
    an identification; and
    a position of the attached structure on a road having a transition curve interposed between a straight portion and an arc portion of the road;
  identifying a starting position of the transition curve associated with the identification of the attached structure with reference to a table describing an association between the identification of the attached structure and the starting position of the transition curve measured from the attached structure;
  controlling capturing, by a camera, an image including the attached structure on the road;
  storing, in at least one memory, a predetermined distance from the position of the attached structure to the starting position of the transition curve in association with the identification of the attached structure;
  detecting the identification of the attached structure reflected in the image captured by the camera; and
  identifying the starting position of the transition curve with reference to the at least one memory using the identification of the attached structure,
  wherein the table describes a plurality of numbers indicating a plurality of attached structures having a plurality of identifications sequentially disposed on the road in a traveling direction of the vehicle in association with a plurality of distances each re presenting the predetermined distance from the position of each attached structure and the starting position of the transition curve,
  wherein the method further comprises, if a first attached structure having a first identification is detected from the image captured by the camera among the plurality of attached structures such that the table describes the first identification indicated by multiple numbers in the plurality of numbers, then activating the camera to capture a second image reflecting a second attached structure having a second identification so as to define the second attached structure as a lastly-detected attached structure if the table describes the second identification solely indicated by a single number in the plurality of numbers by updating the multiple numbers, and
  wherein the identifying the starting position of the transition curve with reference to the at least one memory comprises using the identification of the lastly-detected attached structure among the plurality of attached structures described by the table, thus determining the predetermined distance associated with the identification of the lastly-detected attached structure.

9. The road information detection device according to claim 1, wherein the curve-starting-position identification part operates to calculate a secondary distance from the vehicle to the attached structure according to $L1=(h2-h1) \div \tan\theta$ (where L1 denotes the secondary distance, h1 denotes a first height of detecting the attached structure, h2 denotes a second height of the attached structure, and $\theta$ denotes an angle formed between a position of detecting the attached structure and the position of the attached structure due to a difference between the first height and the second height), thus identifying the starting position of the transition curve using an addition of the secondary distance to the predetermined distance.

10. The road information detection method according to claim 7, further comprising: calculating a secondary distance from the vehicle to the attached structure according to $L1=(h2-h1)\div\tan\theta$ (where L1 denotes the secondary distance, h1 denotes a first height of detecting the attached structure, h2 denotes a second height of the attached structure, and $\theta$ denotes an angle formed between a position of detecting the attached structure and the position of the attached structure due to a difference between the first height and the second height), thus identifying the starting position of the transition curve using an addition of the secondary distance to the predetermined distance.

11. The road information detection device according to claim 1, wherein the table is configured to store an interval of distance before or after a currently-detected attached structure compared with its neighboring attached structure on the road in the traveling direction, and wherein the attached-structure detection part is configured to estimate the currently-detected attached structure using the interval of distance.

12. The road information detection method according to claim 7, wherein the table is configured to store an interval of distance before or after a currently-detected attached structure compared with its neighboring attached structure on the road in the traveling direction, and wherein the attached-structure detection part is configured to estimate the currently-detected attached structure using the interval of distance.

* * * * *